United States Patent
Cimpu et al.

(10) Patent No.: US 10,327,219 B2
(45) Date of Patent: Jun. 18, 2019

(54) TIMING BASED UE POSITIONING IN SHARED CELL ENVIRONMENT

(71) Applicant: Telefonaktiebolaget LM Ericsson (publ), Stockholm (SE)

(72) Inventors: Virgil Cimpu, Ottawa (CA); Leonard Lightstone, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/756,496

(22) PCT Filed: Sep. 4, 2015

(86) PCT No.: PCT/IB2015/056778
§ 371 (c)(1),
(2) Date: Feb. 28, 2018

(87) PCT Pub. No.: WO2017/037518
PCT Pub. Date: Mar. 9, 2017

(65) Prior Publication Data
US 2018/0263009 A1 Sep. 13, 2018

(51) Int. Cl.
*H04W 64/00* (2009.01)
*G01S 5/10* (2006.01)
(Continued)

(52) U.S. Cl.
CPC ............. *H04W 64/003* (2013.01); *G01S 5/10* (2013.01); *H04L 5/0053* (2013.01); *H04W 24/10* (2013.01); *H04W 64/00* (2013.01)

(58) Field of Classification Search
CPC ... H04W 64/003; H04W 24/10; H04W 64/00; G01S 5/10; H04L 5/0053
See application file for complete search history.

(56) References Cited

U.S. PATENT DOCUMENTS 8,838,137 B2 9/2014 Bhattacharya et al.
2004/0180669 A1 9/2004 Kall
(Continued)

FOREIGN PATENT DOCUMENTS

EP 2099240 A1 9/2009
JP 2004221767 A 8/2004
(Continued)

OTHER PUBLICATIONS

Non-Final Office Action for U.S. Appl. No. 15/869,875, dated Feb. 28, 2018, 6 pages.
(Continued)

*Primary Examiner* — Mazda Sabouri
(74) *Attorney, Agent, or Firm* — Withrow & Terranova, PLLC

(57) ABSTRACT

The present disclosure relates to systems and methods for determining the location of a wireless device in a shared cell deployment/system. In some embodiments, a method of operation of one or more network nodes comprises obtaining separate samples of at least a portion of one or more uplink transmissions received by at least a subset of a plurality of Receive/Transmit (R/T) points in a shared cell from a wireless device. The separate samples comprise, for each R/T point of the at least a subset of the plurality of R/T points in the shared cell, a sample of at least a portion of an uplink transmission received by the R/T point from the wireless device. The method further comprises performing multilateration based on range estimates for ranges between the wireless device and the at least a subset of the plurality of R/T points determined from the separate samples.

20 Claims, 7 Drawing Sheets

(51) Int. Cl.
*H04L 5/00* (2006.01)
*H04W 24/10* (2009.01)

(56) References Cited

U.S. PATENT DOCUMENTS

| | | |
|---|---|---|
| 2008/0232328 A1 | 9/2008 | Scheinert et al. |
| 2009/0191891 A1 | 7/2009 | Ma et al. |
| 2011/0092218 A1 | 4/2011 | Urie |
| 2012/0178473 A1 | 7/2012 | Wiren et al. |
| 2012/0208541 A1 | 8/2012 | Luo et al. |
| 2012/0327800 A1 | 12/2012 | Kim et al. |
| 2013/0051317 A1* | 2/2013 | Ji .................. H04W 24/02 370/328 |
| 2014/0018103 A1 | 1/2014 | Wigren et al. |
| 2014/0141792 A1 | 5/2014 | Larsson et al. |
| 2014/0161447 A1 | 6/2014 | Graves et al. |
| 2014/0269322 A1 | 9/2014 | Li et al. |
| 2014/0302870 A1 | 10/2014 | Cui et al. |
| 2015/0223125 A1 | 8/2015 | Lu et al. |
| 2016/0234773 A1 | 8/2016 | Choi et al. |
| 2017/0150317 A1 | 5/2017 | Iun et al. |
| 2017/0227625 A1* | 8/2017 | Markhovsky ......... G01S 5/0215 |

FOREIGN PATENT DOCUMENTS

| | | |
|---|---|---|
| WO | 2012116007 A1 | 8/2012 |
| WO | 2012173540 A1 | 12/2012 |
| WO | 2013150344 A1 | 10/2013 |
| WO | 2014023999 A1 | 2/2014 |
| WO | 2015026287 A2 | 2/2015 |
| WO | 2015099582 A1 | 7/2015 |
| WO | 2017003325 A1 | 1/2017 |
| WO | 2017037517 A1 | 3/2017 |

OTHER PUBLICATIONS

International Preliminary Report on Patentability for International Patent Application No. PCT/IB2015/056778, dated Mar. 15, 2018, 10 pages.
Federal Communications Commission, FCC 14-13, In the Matter of "Wireless E911 Location Accuracy Requirements: Third Further Notice of Proposed Rulemaking," PS Docket No. 07-114, adopted Feb. 20, 2014, 95 pages.
Non-Final Office Action for U.S. Appl. No. 14/782,979, dated Mar. 20, 2017, 8 pages.
Final Office Action for U.S. Appl. No. 14/782,979, dated Jul. 28, 2017, 10 pages.
Notice of Allowance for U.S. Appl. No. 14/782,979, dated Oct. 13, 2017, 7 pages.
International Search Report and Written Opinion for International Patent Application No. PCT/IB2015/056777, dated May 19, 2016, 11 pages.
International Preliminary Report on Patentability for International Patent Application No. PCT/IB2015/056777, dated Aug. 23, 2017, 6 pages.
International Search Report and Written Opinion for International Patent Application No. PCT/IB2015/056778, dated May 6, 2016, 14 pages.
Intel Corporation, "R1-154415: TP for TR37.857 on Same Cell ID Case 9Section 7.1.1.1.5)," 3GPP TSG-RAN WG1 #82, Aug. 24-25, 2015, Beijing, China, 6 pages.
Notification of Reasons for Refusal for Japanese Patent Application No. 2018-511732, dated Jan. 28, 2019, 7 pages.
Search Report for Japanese Patent Application No. 2018-511732, dated Jan. 31, 2019, 40 pages.

* cited by examiner

TIMING BASED UE POSITIONING IN SHARED CELL ENVIRONMENT

This application is a 35 U.S.C. § 371 national phase filing of International Application No. PCT/IB2015/056778, filed Sep. 4, 2015, the disclosure of which is incorporated herein by reference in its entirety.

TECHNICAL FIELD

The present disclosure relates to User Equipment device (UE) positioning in a cellular communications network and, more specifically, to UE positioning in a shared cell environment.

BACKGROUND

The constantly increasing demand for high data rates in cellular networks requires new approaches to meet this demand. A challenging question for operators is how to evolve their existing cellular networks so as to meet the requirement for higher data rates. In this respect, a number of approaches are possible, namely: (i) increase the density of existing macro base stations, (ii) increase the cooperation between macro base stations, or (iii) deploy smaller base stations in areas where high data rates are needed within a macro base station grid. The last approach is referred to as a "heterogeneous network," or "heterogeneous deployment," where the heterogeneous network/deployment includes a macro cell layer (i.e., a layer of macro base stations serving corresponding macro cells) and one or more small cell layers (i.e., one or more layers of smaller, or lower power, base stations serving corresponding small cells). The small cells may sometimes be referred to as, for example, micro cells or pico cells.

The notion of a shared cell (also referred to as a "same cell," a "merged cell," or a "soft cell") is one possible instantiation of a heterogeneous network. In a shared cell, a number of Receive/Transmit (R/T) points share the same cell Identifier (ID) as well as cell specific signals such that, from a wireless device (e.g., User Equipment device (UE)) perspective, these smaller "cells" served by the R/T points are seen as one effective cell (i.e., the same cell).

In a shared cell, several R/T points, each with their own coverage area, collectively serve a larger coverage area that is identified with a cell ID. Typically, identical signals are transmitted at each R/T point, though this is not required if there is sufficient Radio Frequency (RF) isolation between regions within the shared cell and/or if the information is scheduled over the air so as to avoid a wireless device receiving conflicting, non-resolvable information. The shared cell approach avoids the proliferation of cell IDs. Shared cells also avoid the high signaling load that would occur if each R/T point was a stand-alone cell and required hand-off operations as wireless devices moved through the general coverage area.

A wireless device connected to a shared cell does not distinguish between the different R/T points in the shared cell. However, the central processing node for the shared cell (e.g., an enhanced or evolved Node B (eNB) in 3$^{rd}$ Generation Partnership Project (3GPP) Long Term Evolution (LTE)) may or may not distinguish between the R/T points for uplink signals depending on whether separate lines are provided between the central processing node and the different R/T points. In this disclosure, two shared cell configurations are considered, and the following nomenclature is used:

Merged cell: A merged cell is a type of shared cell formed by multiple R/T points each sharing a common cell ID, transmitting a common signal set and, in the uplink direction, providing a common return for processing. In a merged cell, the central processing node is not able to distinguish between the different R/T points for uplink signals due to the fact that the uplink signals from the different R/T points are combined prior to processing.

Combined cell: A combined cell is a type of shared cell formed by multiple R/T points (or their equivalent) each sharing a common cell ID, but capable of transmitting a unique signal set and, in the uplink direction, providing a unique return for processing for each R/T point (or its equivalent).

Currently, shared cell deployments are of particular interest for indoor systems. Indoor system deployments are becoming popular solutions for addressing the exponential increase of mobile data throughputs and the overload that macro systems are experiencing. Since the majority of mobile traffic is indoor, deploying indoor systems in buildings holding a significant number of mobile users will significantly increase the user experience for the indoor users and, at the same time, will off-load the macro network.

In a typical indoor deployment, the R/T points are separated by a distance on the order of approximately 10 to 30 meters (m); however, actual distances between the R/T points will be dependent on the specifics of the RF behavior and room layout in the particular indoor environment (e.g., building). Therefore, in a typical indoor environment, a wireless device will be relatively close to several R/T points in the shared cell and will provide good uplink quality signals to the receive antennas of many of the R/T points.

There are many potential applications for the use of the location of wireless devices in a cellular network. Examples include:

Enhanced 911 (E911) location for emergency services. In this regard, wireless device location performance capabilities are mandated by the Federal Communications Commission (FCC).

UE location for commercial and user applications that rely on UE position knowledge.

There are several existing technologies, e.g., Global Positioning System (GPS), that can be employed to determine the location of a wireless device. However, in many cases, wireless devices will not have access to the technology. In particular, in an indoor environment, wireless devices do not normally have access to GPS technology. Multilateration is also a known technology for determining the location of a wireless device in a conventional cellular network (i.e., in a non-shared cell deployment). The basic concept of multilateration is the determination of the range between the wireless device of interest and a set of geographically distributed reference points having known locations. In LTE, downlink based multilateration techniques may be used (i.e., Observed Time Difference of Arrival (OTDOA)) by comparing Positioning Reference Signal (PRS) symbols between cells. Uplink LTE signals can also be used for ranging between cells (Uplink Time Difference of Arrival (UTDOA)), but this is more challenging since, unlike the downlink PRS reference symbols, the uplink signals are not designed to be normally hearable between cells. While at a high level, the processing involved in OTDOA and UTDOA is the same (ranging and multilateration), there are key differences in where the processing is performed and with the signals involved in processing.

While GPS and multilateration provide for wireless device location determination in a conventional cellular network, shared cell deployments present new issues. For example, as discussed above, in an indoor shared cell deployment, GPS is normally not available. Further, particularly for merged cells where the uplink signals from the different R/T points are combined before processing, conventional uplink multilateration cannot be used. As such, there is a need for systems and methods for determining the location of a wireless device in a shared cell deployment and, in particular, in a merged cell deployment.

SUMMARY

The present disclosure relates to systems and methods for determining the location of a wireless device in a shared cell deployment/system. In some embodiments, a method of operation of one or more network nodes to determine a location of a wireless device in a shared cell environment is provided. The method comprises obtaining separate samples of at least a portion of one or more uplink transmissions received by at least a subset of a plurality of Receive/Transmit (R/T) points in a shared cell from a wireless device. The separate samples comprise, for each R/T point of the at least a subset of the plurality of R/T points in the shared cell, a sample of at least a portion of an uplink transmission received by the R/T point from the wireless device. The method further comprises performing multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine a location of the wireless device.

In some embodiments, obtaining the separate samples comprises scheduling an uplink transmission by the wireless device and muting received signals output by all but one of the plurality of R/T points during a time window corresponding to at least a portion of the uplink transmission by the wireless device to thereby provide a non-muted receive signal corresponding to the at least a portion of the uplink transmission received by the one of the plurality of R/T points and muted receive signals for all of the other R/T points of the plurality of R/T points. The one of the plurality of R/T points is one of the at least a subset of the plurality of R/T points. Obtaining the separate samples further comprises combining the non-muted receive signal and the muted receive signals during the time window corresponding to the at least a portion of the uplink transmission by the wireless device to provide the sample of the at least a portion of the uplink transmission received by the one of the plurality of R/T points from the wireless device, and repeating the operations of scheduling, muting, and combining for all of the other R/T points in the at least a subset of the plurality of R/T points. Further, in some embodiments, the time window corresponding to the at least a portion of the uplink transmission by the wireless device is a time window corresponding to an uplink Sounding Reference Symbol (SRS) included in the uplink transmission by the wireless device.

Further, in some embodiments, performing multilateration comprises computing a range estimate for a range between the wireless device and each R/T point of the at least a subset of the plurality of R/T points based on the corresponding sample, and computing the location of the wireless device based on the range estimates.

In some embodiments, obtaining the separate samples comprises scheduling an uplink transmission by the wireless device and, during a time window corresponding to at least a portion of the uplink transmission by the wireless device, prior to combining received signals output by the plurality of R/T points to provide a combined receive signal for the shared cell, simultaneously obtaining portions of the received signals received by the at least a subset of the plurality of R/T points during the time window as the separate samples of the at least a portion of the uplink transmission received by the at least a subset of the plurality of R/T points. Further, in some embodiments, the time window corresponding to the at least a portion of the uplink transmission by the wireless device is a time window corresponding to an uplink SRS included in the uplink transmission by the wireless device.

Further, in some embodiments, obtaining the separate samples further comprises time-multiplexing the separate samples of the at least a portion of the uplink transmission received by the at least a subset of the plurality of R/T points to provide a time-multiplexed signal. Still further, in some embodiments, the one or more network nodes comprise a first network node and a second network node, obtaining the separate samples comprises obtaining the separate samples at the first network node, performing multilateration comprises performing multilateration at the second network node, and obtaining the separate samples further comprising sending the time-multiplexed signal from the first network node to the second network node.

Still further, in some embodiments, sending the time-multiplexed signal from the first network node to the second network node comprises sending the time-multiplexed signal from the first network node to the second network node over a common link with the combined receive signal for the shared cell.

In some embodiments, performing multilateration comprises computing a range estimate for a range between the wireless device and each R/T point of the at least a subset of the plurality of R/T points based on the corresponding sample and computing the location of the wireless device based on the range estimates.

Embodiments of a system operable to determine a location of a wireless device in a shared cell environment are also disclosed. In some embodiments, the system comprises a processing system for a shared cell of a cellular communications network operable to: obtain separate samples of at least a portion of one or more uplink transmissions received by at least a subset of a plurality of R/T points in the shared cell from the wireless device, the separate samples comprising, for each R/T point of the at least a subset of the plurality of R/T points in the shared cell, a sample of at least a portion of an uplink transmission received by the R/T point from the wireless device; and perform multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine the location of the wireless device.

In some embodiments, in order to obtain the separate samples, the processing system is further operable to: schedule an uplink transmission by the wireless device; during a time window corresponding to at least a portion of the uplink transmission by the wireless device, mute received signals output by all but one of the plurality of R/T points to thereby provide a non-muted receive signal corresponding to the at least a portion of the uplink transmission received by the one of the plurality of R/T points and muted receive signals for all of the other R/T points of the plurality of R/T points, the one of the plurality of R/T points being one of the at least a subset of the plurality of R/T points; combine the non-muted receive signal and the muted receive signals during the time window corresponding to the at least a portion of the uplink transmission by the wireless device to provide the sample of the at least a portion of the uplink transmission received by the one of the plurality of R/T points from the wireless device; and repeat the operations of scheduling, muting, and combining for all of the other R/T points in the at least a subset of the plurality of R/T points. Further, in some embodiments, the time window corresponding to the at least a portion of the uplink transmission by the wireless device is a time window corresponding to an uplink SRS included in the uplink transmission by the wireless device.

In some embodiments, in order to perform multilateration, the processing system is further operable to compute a range estimate for a range between the wireless device and each R/T point of the at least a subset of the plurality of R/T points based on the corresponding sample, and compute the location of the wireless device based on the range estimates.

In some embodiments, in order to obtain the separate samples, the processing system is further operable to: schedule an uplink transmission by the wireless device; and, during a time window corresponding to at least a portion of the uplink transmission by the wireless device, prior to combining received signals output by the plurality of R/T points to provide a combined receive signal for the shared cell, simultaneously obtain portions of the received signals received by the at least a subset of the plurality of R/T points during the time window as the separate samples of the at least a portion of the uplink transmission received by the at least a subset of the plurality of R/T points. Further, in some embodiments, the time window corresponding to the at least a portion of the uplink transmission by the wireless device is a time window corresponding to an uplink SRS included in the uplink transmission by the wireless device.

In some embodiments, in order to obtain the separate samples, the processing system is further operable to time-multiplex the separate samples of the at least a portion of the uplink transmission received by the at least a subset of the plurality of R/T points to provide a time-multiplexed signal. Further, in some embodiments, the system comprises a first network node and a second network node, the processing system being distributed across the first network node and the second network node such that: the separate samples are obtained at the first network node and multilateration is performed at the second network node based on the separate samples obtained at the first network node, wherein the first network node is operable to send the time-multiplexed signal from the first network node to the second network node. Further, in some embodiments, in order to send the time-multiplexed signal from the first network node to the second network node, the processing system is further operable to send the time-multiplexed signal from the first network node to the second network node over a common link with the combined receive signal for the shared cell.

In some embodiments, in order to perform multilateration, the processing system is further operable to compute a range estimate for a range between the wireless device and each R/T point of the at least a subset of the plurality of R/T points based on the corresponding sample and compute the location of the wireless device based on the range estimates.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
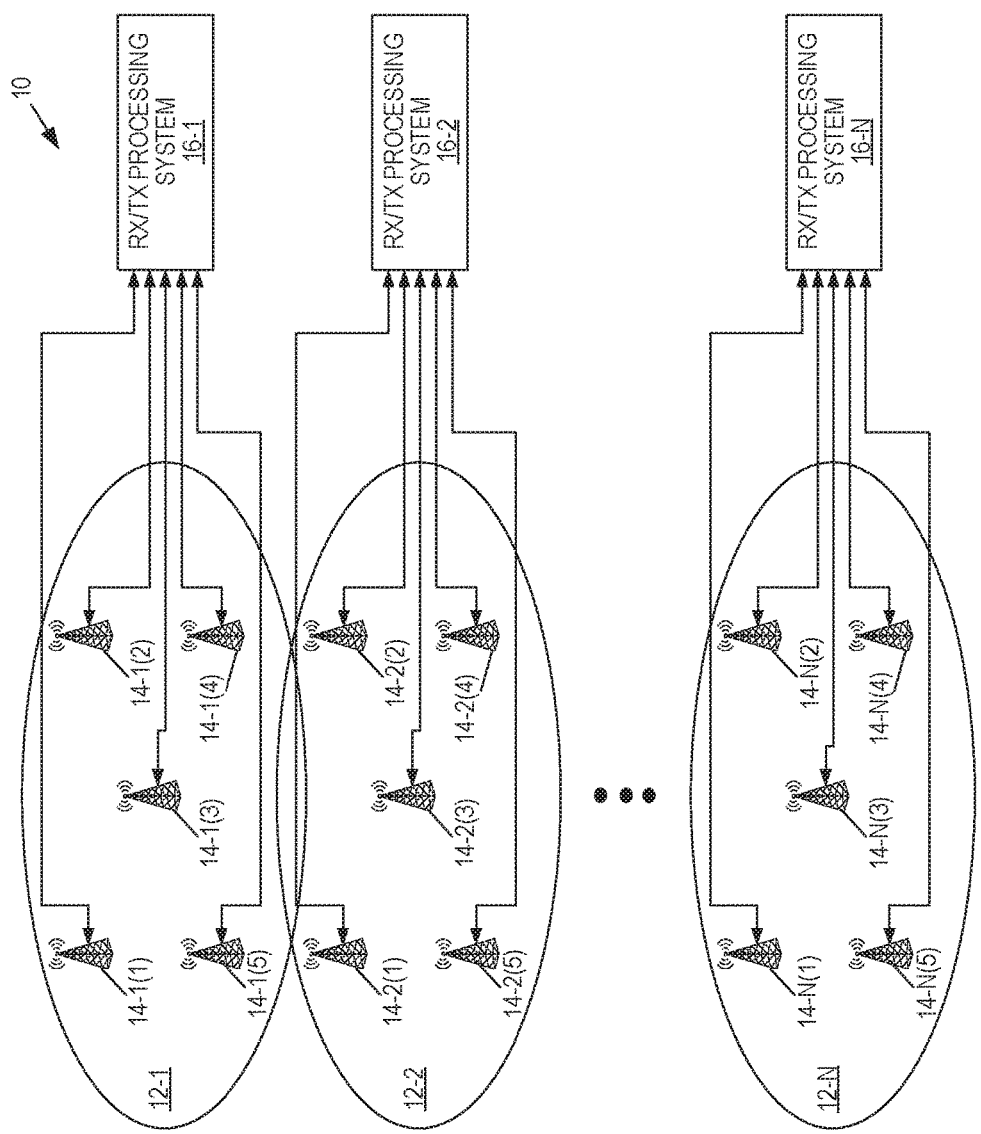
FIG. 1 illustrates one example of a cellular network including multiple shared cells in which multilateration is used to determine the location of wireless devices according to some embodiments of the present disclosure.

The present disclosure relates to systems and methods for determining the location of a wireless device in a shared cell deployment/system. The systems and methods described herein are particularly well-suited to indoor environments, but are not limited thereto. In this regard, FIG. 1 illustrates one example of a cellular network 10 including multiple shared cells 12-1 through 12-N (generally referred to herein collectively as shared cells 12 and individually as shared cell 12). The shared cell 12-1 includes, or is served by, multiple Receive/Transmit (R/T) points 14-1(1) through 14-1(5) (which are generally referred to herein collectively as R/T points 14-1 of the shared cell 12-1 or individually as R/T point 14-1 of the shared cell 12-1). Likewise, the other shared cells 12-2 through 12-N include, or are served by, corresponding R/T points. In particular, the shared cell 12-2 includes, or is served by, R/T points 14-2(1) through 14-2(5) (which are generally referred to herein collectively as R/T points 14-2 of the shared cell 12-2 or individually as R/T point 14-2 of the shared cell 12-2), and the shared cell 12-N includes, or is served by, R/T points 14-N(1) through 14-N (5) (which are generally referred to herein collectively as R/T points 14-N of the shared cell 12-N or individually as R/T point 14-N of the shared cell 12-N). The R/T points 14-1 through 14-N are more generally referred to herein collectively as R/T points 14 and individually as R/T point 14. Notably, while in this example each of the shared cells 12 includes five R/T points 14, this is only an example. Each of the shared cells 12 can include any number of two or more R/T points 14, but preferably each include several R/T points 14 to assist with multilateration. Further, the shared cells 12 may include different numbers of R/T points 14.

The R/T points 14 are generally Radio Frequency (RF) front-ends and, as such, include components such as, for example, antennas, amplifiers, filters, and/or the like. The shared cells 12-1 through 12-N have respective Reception/Transmission (RX/TX) processing systems 16-1 through 16-N (which are generally referred to herein collectively as RX/TX processing systems 16 and individually as RX/TX processing system 16). Depending on the particular implantation, each RX/TX processing system 16 may be implemented as or in a single network node (e.g., an enhanced or evolved Node B (eNB)) or as or in multiple network nodes, e.g., an Indoor, or Intermediate, Radio Unit (IRU) and a baseband/digital unit where, e.g., the baseband/digital unit may be implemented in an eNB). Therefore, the RX/TX processing systems 16 are implemented as hardware or a combination of hardware and software.

In operation, for downlink transmission, the RX/TX processing system 16 generates a downlink signal and provides the downlink signal to each of the R/T points 14 in the shared cell 12 for transmission. Conversely, for uplink reception, the R/T points 14 in the shared cell 12 each receive in the uplink frequency band and output respective received signals to the RX/TX processing system 16. At the RX/TX processing system 16, particularly for a merged cell implementation of the shared cell 12, the received signals from the R/T points 14 are combined to provide a combined received signal. The combined received signal is then processed by the RX/TX processing system 16.

Uplink signals within a shared cell 12 are expected to be easily detectable at several of the R/T points 14 within the shared cell 12. Since the uplink signal is detectable, or "hearable," at several different R/T points 14, which have known locations, this provides an ideal situation for performing uplink multilateration based measurements at one central node, which in this case is the RX/TX processing system 16. Use of a central node avoids problems of inter-node timing discrepancies and sharing of information. As used herein, multilateration is any technique that uses three or more data points (i.e., distances or ranges) to determine the location of a wireless device.

However, using conventional technology, uplink multilateration is not available to determine the location of a wireless device (e.g., a User Equipment device (UE)) within the shared cell 12 because the separate received signals from the R/T points 14 are combined prior to processing. Systems and methods are described herein that enable separate samples of at least a portion of one or more uplink transmissions by a wireless device to be obtained by the RX/TX processing system 16 and then be utilized to compute the location of the wireless device using a multilateration technique.

Figure 2:
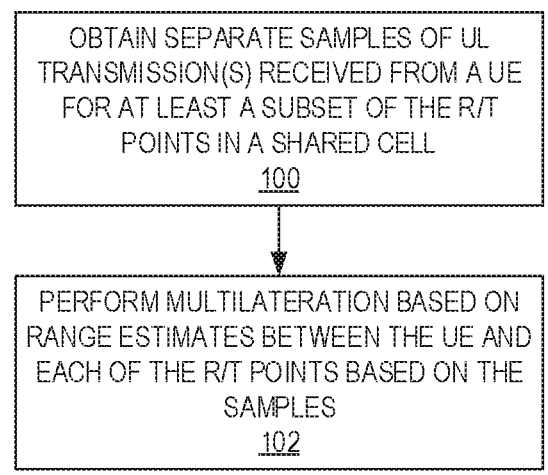
FIG. 2 is a flow chart that illustrates the operation of the Reception/Transmission (RX/TX) processing system of FIG. 1 to determine the location of a wireless device according to some embodiments of the present disclosure.

In this regard, FIG. 2 is a flow chart that illustrates the operation of the RX/TX processing system 16 to determine the location of a wireless device according to some embodiments of the present disclosure. Notably, this process may be performed for multiple wireless devices, e.g. in parallel. As illustrated, the RX/TX processing system 16 obtains separate samples of one or more uplink transmissions received by at least a subset of the R/T points 14 in the shared cell 12 from a wireless device of interest (step 100). In some embodiments, samples are obtained for all of the R/T points 14. However, in other embodiments, samples are obtained for only a subset of the R/T points 14. For example, some of the R/T points 14 may have a weak received signal strength or are expected to have a weak signal strength with respect to the uplink transmission(s) from the wireless device. As such, samples may not be obtained for these R/T points 14. In other words, the samples may only be obtained for those R/T points 14 that have or are expected to have a received signal strength with respect to the wireless device that is greater than some predefined threshold (i.e., a strong received signal strength).

While any uplink transmission or any portion of an uplink transmission may be used to obtain the samples, in some particular embodiments, the samples are samples of the portions of the received signals from the at least a subset of the R/T points 14 that correspond to an uplink Sounding Reference Symbol(s) (SRS) within the uplink transmission(s). As described below in detail, in some embodiments, the separate samples are obtained by sequentially muting the received signals from all but one of the R/T points 14 prior to combining at the RX/TX processing system 16 such that the resulting combined signal is representative of only the received signal from the un-muted R/T point 14. In other embodiments, the separate samples are obtained by extracting the samples from the received signals output by the at least a subset of the R/T points 14 prior to combining at the RX/TX processing system 16.

Once the separate samples are obtained, the RX/TX processing system 16 performs multilateration based on the samples (step 102). Notably, the geographic locations of the R/T points 14 are known. In addition, the delay between each of the R/T points 14 and the aggregator (i.e., the RX/TX processing system 16 or some specific component of the RX/TX processing system 16) is known. In particular, for each R/T point 14 for which a sample was obtained, the RX/TX processing system 16 computes a range estimate for the range between the wireless device and that R/T point 14 based on the sample obtained for that R/T point 14. More specifically, within the shared cell 12, the wireless device will receive downlink reference signals from the R/T points 14. From the structure of the downlink signals, the wireless device determines its timing reference ($t_0$) for generating uplink signals, as is well known in the art. This timing reference ($t_0$) likely does not correspond to the delay between the wireless device and any one R/T point 14 and, in this respect, differs from the timing reference ($t_0$) in the non-shared cell case. Using the sample of the at least a portion of the uplink transmission from the wireless device received by the R/T point 14, the RX/TX processing system 16 determines a Time Difference of Arrival (TDOA) between the received signal at the R/T point 14 and the timing reference ($t_0$). This TDOA is equivalent to a range estimate for the range between the wireless device and the R/T point 14. The range estimates, or time differences, computed for each of the R/T points 14 for which samples were obtained are then utilized by the RX/TX processing system 16 to compute the location of the wireless device using a multilateration technique. Multilateration is well known in the art and, as such, the details are not repeated herein.

Figure 3:
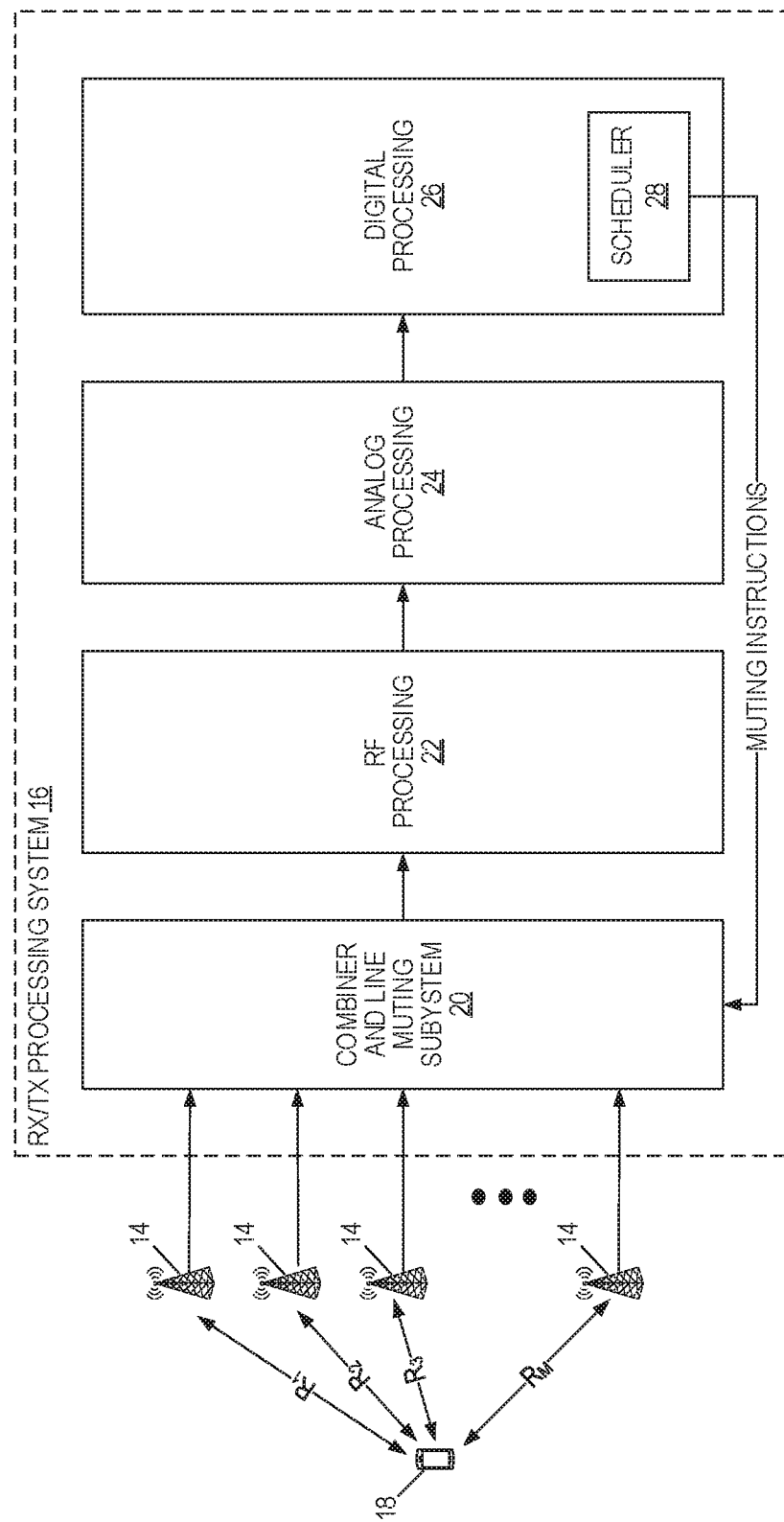
FIG. 3 illustrates the RX/TX processing system in more detail according to some embodiments of the present disclosure.

FIG. 3 illustrates the RX/TX processing system 16 in more detail according to some embodiments of the present disclosure. In the embodiment of FIG. 3, the RX/TX processing system 16 operates to perform sequential muting of at least portions of uplink transmissions (e.g., uplink symbols) at different R/T points 14, and thereby acquires range estimates $R_1$ through $R_N$ for ranges between a wireless device 18 and those R/T points 14. This is referred to herein as sequential Uplink TDOA (UTDOA). For the indoor scenario, movement of the wireless device 18 over the acquisition interval will be small and will only introduce minor errors into the position estimate. The use of sequential muting makes it possible to collect select data from individual R/T points 14 while still performing data aggregation across all the R/T points 14 and conserving bandwidth between the aggregation point (e.g., a combiner 20) and the processing unit (e.g., a digital processing subsystem 26).

As illustrated in FIG. 3, the RX/TX processing system 16 includes a combiner and line muting subsystem 20, an RF processing subsystem 22, an analog processing subsystem 24, and a digital processing subsystem 26 including a scheduler 28. For normal uplink operation, an uplink transmission from the wireless device 18 is received by at least some of the R/T points 14. The R/T points 14 output the respective receive signals to the RX/TX processing system 16. At the RX/TX processing system 16, the combiner and line muting subsystem 20 combines the separate receive signals from the R/T points 14 to provide a combined received signal. The RF processing subsystem 22 includes, for example, filters, mixers, downconverters, or similar components that process the combined received signal to provide either an intermediate frequency or a baseband frequency combined signal. The analog processing subsystem 24 then performs processing such as, for example, analog-to-digital conversion, to provide a digital intermediate frequency or a baseband frequency signal. This digital signal is then processed by the digital processing subsystem 26 according to one or more desired baseband processing operations (e.g., Fast Fourier Transform (FFT), demodulation, decoding, etc.).

As discussed in more detail below, in order to estimate the location of the wireless device 18, the scheduler 28 schedules an uplink transmission by the wireless device 18. The scheduler 28 sends a muting instruction to the combiner and line muting subsystem 20 instructing the combiner and line muting subsystem 20 to mute receive signals from all but one of the R/T points 14 during a time window corresponding to reception of at least a portion of the uplink transmission from the wireless device 18. For example, in some embodiments, the uplink transmission includes an uplink SRS and the combiner and line muting subsystem 20 is instructed to mute the receive signals from all but one of the R/T points 14 during a time window corresponding to reception of the uplink SRS. As a result of the muting, the combiner and line muting subsystem 20 outputs a combined receive signal that represents the at least a portion of the uplink transmission from the wireless device 18 that is received by the one of the R/T points 14 that is not muted. This combined signal is then processed by the RF processing subsystem 22 and the analog processing subsystem 24 to provide a corresponding intermediate frequency or baseband signal to the digital processing subsystem 26. The digital processing subsystem 26 processes the signal to determine the timing error with respect to the timing reference ($t_0$), which is a range estimate for the range R between the wireless device 18 and the R/T point 14. This process is repeated to obtain range estimates for all or at least a subset of the R/T points 14 in the shared cell 12.

Notably, the received signal strength of uplink transmissions from the wireless device 18 at some of the R/T points 14 maybe weak (e.g., less than a predetermined threshold). In this case, the above process may be performed only for those R/T points 14 for which the received signal from the wireless device 18 is, or is expected to be, strong (e.g., greater than a predetermined threshold). For example, in an indoor environment, a strong signal can normally be expected to be present at most, if not all, of the R/T points 14 in the shared cell 12. Thus, in some embodiments, the process above is performed for all of the R/T points 14 in the shared cell 12. However, in some scenarios, the received signal strength at some of the R/T points 14 in the shared cell 12 is, or is expected to be, weak, in which case the above process is performed for only those R/T points 14 at which the received signal strength is, or is expected to be, strong.

Once the range estimates for the R/T points 14 are obtained, the digital processing subsystem 26 computes the location of, or more specifically an estimate of the location of, the wireless device 18 using a multilateration technique. Multilateration is well known to those of skill in the art. As such, the details of multilateration are not repeated herein.

Typically, if the wireless device 18 is indoors, the wireless device 18 is stationary or has relatively low mobility. Even at running speeds (~13 kilometers per hour (km/hr)), the wireless device 18 will move less than 3.6 meters (m) in a second. Therefore, if the range estimate values needed for the multilateration processing can all be obtained in some time nominally less than, or equal to, e.g., one second, good to excellent position estimates can be obtained.

Timing estimates can be obtained from any uplink signal. Typically in Long Term Evolution (LTE), uplink SRS are used for this purpose because they are wideband (hence provide good range resolution and are less prone to fading), because they do not carry any user data, and because they are periodic and each occurrence does not need to be explicitly scheduled. However, the concepts described herein can use any uplink signal provided that the uplink signal can be scheduled and can be isolated on a per wireless device basis.

Figure 4:
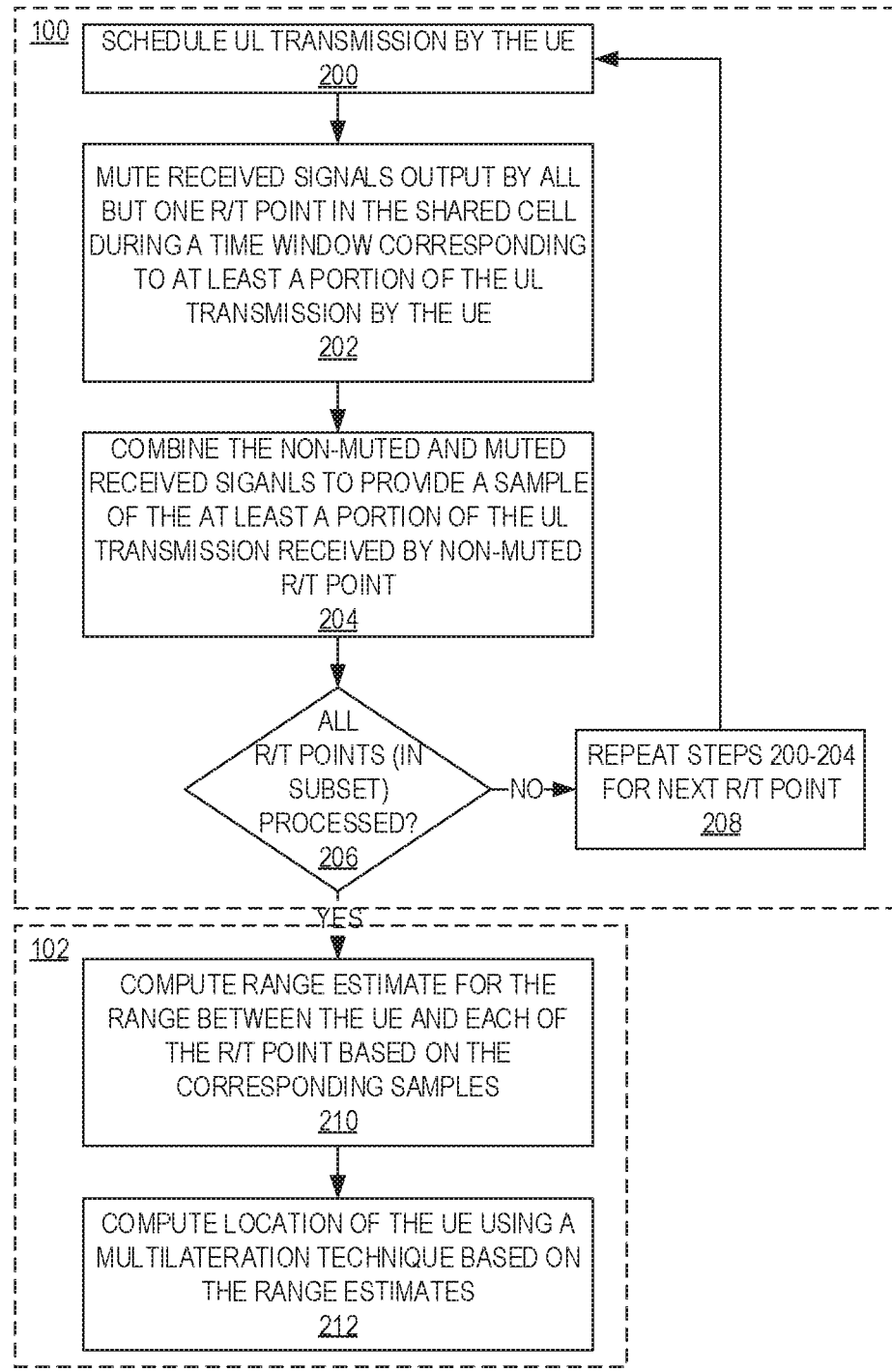
FIG. 4 illustrates the operation of the RX/TX processing system of FIG. 3 according to some embodiments of the present disclosure.

FIG. 4 illustrates the operation of the RX/TX processing system 16 of FIG. 3 according to some embodiments of the present disclosure. The process illustrated in FIG. 4 is also a more detailed illustration of the process of FIG. 2 according to some embodiments of the present disclosure. As illustrated, in order to obtain the samples for the different R/T points 14, the RX/TX processing system 16, and in particular the scheduler 28, schedules an uplink transmission by the wireless device, or UE, 18 (step 200). The RX/TX processing system 16 mutes received signals output by all but one of the R/T points 14 in the shared cell 12 during a time window corresponding to at least a portion of the uplink transmission by the wireless device 18 (step 202). For example, if uplink SRS is used, the RX/TX processing system 16 mutes the received signals output by all but one of the R/T points 14 in the shared cell 12 during a time window in which an uplink SRS is expected to be received in the uplink transmission from the wireless device 18. Notably, if range estimates are to be obtained for only a subset of the R/T points 14 in the shared cell 12 (e.g., due to weak received signal strength at some of the R/T points 14 in the shared cell 12), the one R/T point 14 for which the received signal is not muted (i.e., the non-muted R/T point 14) is one of the R/T points 14 in the subset of R/T points 14 for which range estimates are to be obtained.

As discussed above with respect to FIG. 3, the muting may be performed within the RX/TX processing system 16, e.g., by the combiner and line muting subsystem 20. However, in some alternative embodiments, the muting may be performed at the R/T points 14 themselves. For instance, the RX/TX processing system 16 may instruct the appropriate R/T points 14 to mute their outputs during the appropriate time window.

The RX/TX processing system 16 combines the non-muted and received signals to provide a sample of the at least a portion of the uplink transmission received by the non-muted R/T point 14 (step 204). As such, a resulting combined received signal represents at least a portion of the uplink transmission received by the non-muted R/T point 14 during the time window during which muting is performed. As discussed above with respect to FIG. 3, this combining and muting may be performed by the combiner and line muting subsystem 20. The RX/TX processing system 16 determines whether samples have been obtained for all of the R/T points 14, or the desired subset of the R/T points 14, in the shared cell 12 (step 206). If not, the RX/TX processing system 16 repeats steps 200-204 for the next R/T point 14 (step 208). It should be noted that the time window for performing the entire operation of obtaining the separate samples for all of the R/T points 14 may depend on factors such as, e.g., the mobility of the wireless device 18. For example, in an indoor environment, the wireless device 18 typically moves slower than when in an outdoor environment. As such, the time window for obtaining the separate samples can be relatively long as compared to that which would be needed for a wireless device 18 having high mobility.

In this example, once all of the samples have been obtained, the RX/TX processing system 16, and in particular the digital processing subsystem 26, computes range estimates for the ranges between the wireless device 18 and the R/T points 14 based on the corresponding samples (step 210). Notably, the steps of FIG. 4 may be performed in any desired order and are not limited to the order in which they are illustrated, provided that the operation does not destroy the relevant information in the signal. For example, the range estimates computed in step 210 may be performed after step 204 before the process is repeated in step 208. As discussed above, range estimates may be computed as a timing offset with respect to the timing reference ($t_o$). Once the range estimates are computed, the RX/TX processing system 16, and in particular the digital processing subsystem 26, computes the location of the wireless device 18, or more specifically an estimate of the location of the wireless device 18, based on the range estimates using a multilateration technique (step 212).

As discussed above, in some embodiments, the scheduler 28 explicitly schedules an uplink transmission by the wireless device 18 of interest. Based on when that uplink transmission, or the appropriate portion of that uplink transmission, is expected to arrive, the scheduler 28 generates a receive muting instruction to mute the receive signals from all R/T points 14 except the one selected R/T point 14 for which a sample, and thus a range estimate, is desired. This process is repeated, cycling through the full set of R/T points 14, and possibly skipping some of the R/T points 14 based on prior knowledge or forecasting of expected poor signal strength. In some embodiments, the muting duration is sufficient to blank out only a select portion of the uplink transmission, but the duration of the muting is preferably designed to have minimal impact on the remaining portion of the uplink transmission.

As a specific example, the uplink SRS symbol of LTE is considered. This signal is periodic, with a period typically of 20 milliseconds (ms). Multiple wireless devices 18 are code and frequency multiplexed onto this signal. Different groups of wireless devices 18 will use different offsets of this signal. The SRS is always the last symbol in an LTE uplink subframe. This case, the muting duration may be designed to have minimal impact on the reception of uplink data and the remaining portion of the uplink transmission, i.e. in the symbol periods in the subframe other than that containing the uplink SRS. For the wireless device(s) 18 of interest, the scheduler 28 specifies the muting instruction for each R/T point 14 so as to sequentially obtain an SRS from each R/T point 14 over the course of several SRS periods. For example, if there are eight R/T points 14 in the shared cell 12 and the SRS period is 20 ms, it will take 8×20=160 ms to acquire a full set of SRS values (see Table 1 below).

The scheduler 28 can also group wireless devices 18 for positioning assessment to use specific SRS symbols, thereby reducing the amount of muting activity required.

For each SRS symbol, normal wireless device 18 signal extraction and range estimation is performed. The data is stored until a complete set of range estimates is available across the set of R/T points 14. Then, multilateration is performed to obtain one position estimate for each UE.

This process can be extended in a straightforward fashion to shared cells that are constructed from a mix of merged and combined cells.

TABLE 1

Multilateration obtained by using the range estimates ($R_1 \ldots R_N$) acquired over the time interval ($T_k$-$T_a$)

| TIME | RECEIVE PATH NOT MUTED | RANGE |
|---|---|---|
| $T_a$ | R/T Point 14-1 | $R_1$ |
| $T_b$ | R/T Point 14-2 | $R_2$ |
| ... | ... | ... |
| $T_k$ | R/T Point 14-N | $R_N$ |

In the embodiments above, sequential processing is utilized to obtain the samples, and thus the range estimates, for the different R/T points 14. The discussion now turns to some other embodiments in which the samples for the different R/T points 14 are obtained simultaneously using the same uplink transmission from the wireless device 18. In these embodiments, the RX/TX processing system 16 is configured to obtain the separate samples for the R/T points 14 using appropriate processing prior to the combining of the receive signals from the R/T points 14. More specifically, selective muting of the uplink transmission (or a portion thereof) of interest for each R/T point 14 is not applied. Rather, the samples of the uplink transmission (i.e., for each R/T point 14 for which a range estimate is desired, a portion of the received signal output from that R/T point 14 to the processing system 16 that corresponds to the uplink transmission from the wireless device 18 or the desired portion thereof) are captured simultaneously. In some embodiments, the samples are then time-multiplexed on to a dedicated stream or signal provided to the digital processing subsystem 26. In parallel to capturing the samples for the different R/T points 14, the RX/TX processing system 16 combines the received signals from the R/T points 14 for normal processing.

Figure 5:
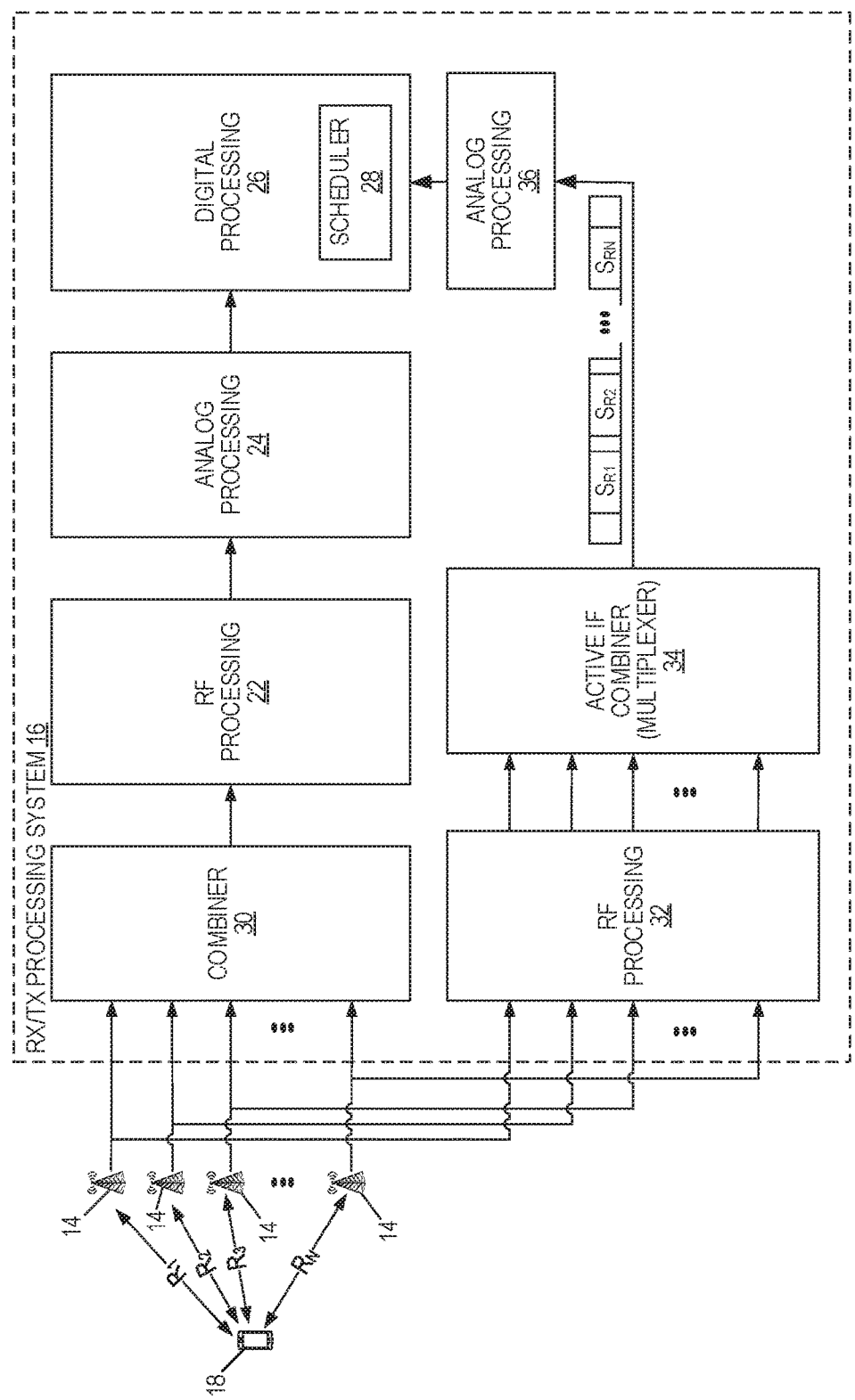
FIG. 5 illustrates the RX/TX processing system in more detail according to some other embodiments of the present disclosure.

One example of the RX/TX processing system 16 according to these embodiments is illustrated in FIG. 5. As illustrated in FIG. 5, the RX/TX processing system 16 includes a combiner 30, the RF processing subsystem 22, the analog processing subsystem 24, and the digital processing subsystem 26. For normal uplink operation, an uplink transmission from the wireless device 18 is received by at least some of the R/T points 14. The R/T points 14 output the respective receive signals to the RX/TX processing system 16. At the RX/TX processing system 16, the combiner 30 combines the separate receive signals from the R/T points 14 to provide a combined received signal. The RF processing subsystem 22 includes, for example, filters, mixers, downconverters, or similar components that process the combined received signal to provide either an intermediate frequency or a baseband frequency combined signal. The analog processing subsystem 24 then performs processing such as, for example, analog-to-digital conversion, to provide a digital intermediate frequency or a baseband frequency signal. This digital signal is then processed by the digital processing subsystem 26 according to one or more desired baseband processing operations (e.g., FFT, demodulation, decoding, etc.).

In order to determine the location of the wireless device 18, the scheduler 28 schedules an uplink transmission for the wireless device 18. The scheduled uplink transmission may be any uplink transmission scheduled for the wireless device 18 or may be an uplink transmission scheduled specifically to determine the location of the wireless device 18. During the time window during which the uplink transmission is expected to be received, or a time window during which a desired portion of the uplink transmission is expected to be received (e.g., a time window corresponding to an uplink SRS), the received signals from all of the R/T points 14, or at least a subset of the R/T points 14, in the shared cell 12 are processed to extract separate samples of the received signals from those R/T points 14. This processing is performed in parallel with the normal uplink processing by the combiner 30, the RF processing subsystem 22, and the analog processing subsystem 24.

More specifically, in this example, the received signals from the R/T points 14 are processed by a RF processing subsystem 32 to provide corresponding intermediate frequency samples of the received signals. In this example, the intermediate frequency samples of the received signals are portions of the received signals from the R/T points 14 during the time window during which the uplink transmission or a select portion of the uplink transmission from the wireless device 18 is expected to be received. Specifically in this example, the intermediate frequency samples of the received signals are portions of the received signals from the R/T points 14 during the time window during which an uplink SRS symbol is expected to be in the uplink transmission. An active Intermediate Frequency (IF) combiner 34, which may also be referred to as a time-multiplexer, combines, or more specifically time-multiplexes, the IF samples of the received signals from all of the R/T points 14 or a select subset of the R/T points 14 into a combined, or time-multiplexed, signal. As illustrated, $S_{R1}$ is the sample for the first R/T point 14, $S_{R2}$ is the sample for the second R/T point 14, etc. As discussed above, the select subset of the R/T points 14 may be those R/T points 14 for which the received signal strength from the wireless device 18 is, or is expected to be, greater than a predefined threshold (i.e., strong). Notably, either in the RF processing subsystem 32 or the active IF combiner 34, any portion of the received signals that is not desired for determining the location of the wireless device 18 may be discarded in order to, e.g. reduce bandwidth.

The time-multiplexed signal is processed by an analog processing subsystem 36, which may perform various functions such as, for example, analog-to-digital conversion, and is provided to the digital processing subsystem 26. The digital processing subsystem 26 extracts the samples for the different R/T points 14 from the time-multiplexed signal. In the same manner as described above, the digital processing subsystem 26 then utilizes the samples to determine range estimates for the ranges between the wireless device 18 and the corresponding R/T points 14. The digital processing subsystem 26 then computes the location of the wireless device 18, or more specifically an estimate of the location of the wireless device 18, based on the range estimates using a multilateration technique.

In some embodiments, the RF processing subsystem 32 and the active IF combiner 34 operate to provide samples for all uplink SRS symbols from the received signals from all R/T points 14 in the shared cell 12. The digital processing subsystem 26 can then utilize the samples along with the known relationship between the uplink SRS symbols and the wireless device(s) 18 of interest to compute the appropriate range estimates for multilateration.

In other embodiments, the RF processing subsystem 32 and the active IF combiner 34 operate to provide samples for only a subset of the uplink SRS symbols from the received signals from all, or subset of, the R/T points 14 in the shared cell 12. This provides a further reduction of the bandwidth overhead for the time-multiplexed signal containing the samples. Here, the scheduler 28 can play an important role in configuring the wireless device 18 with the appropriate SRS resources for processing. Also, unlike user data, the SRS information does not need to be conveyed to the processor in real time since it can be delivered to the processor in a time-distributed fashion.

For example, consider using SRS with a cell period of 5 ms and a merged cell configuration with eight R/T points 14. The number of SRS symbols multiplexed per radio frame (10 ms) is 2*8=16, and the number of regular symbols per radio frame is 14*10=140. Thus, the incremental bandwidth increase to transport multiplexed SRS data is 16/140=11.4%.

Figure 6:
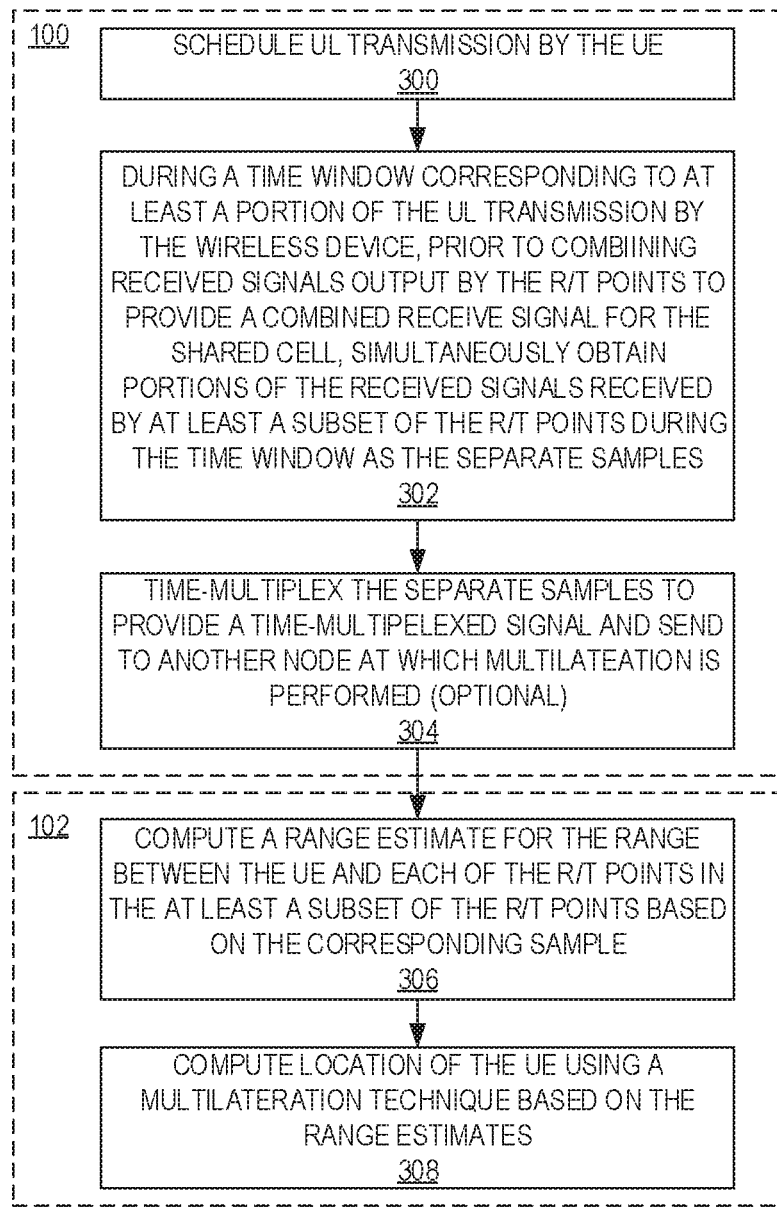
FIG. 6 illustrates the operation of the RX/TX processing system of FIG. 5 according to some embodiments of the present disclosure.

FIG. 6 illustrates the operation of the RX/TX processing system 16 of FIG. 5 according to some embodiments of the present disclosure. The process illustrated in FIG. 6 is also a more detailed illustration of the process of FIG. 2 according to some embodiments of the present disclosure. As illustrated, in order to obtain the samples for the different R/T points 14, the RX/TX processing system 16, and in particular the scheduler 28, schedules an uplink transmission by the wireless device, or UE, 18 (step 300). During a time window corresponding to at least a portion of the uplink transmission by the wireless device 18, prior to combining the received signals output by the R/T points 14 in the shared cell 12 to provide a combined received signal for the shared cell 12, the RX/TX processing system 16 simultaneously obtains portions of the received signal received by at least a subset of the R/T points 14 during the time window (step 302). Again using uplink SRS as an example, during a time window during which an uplink SRS is expected to be received within the uplink transmission, the processing system 16 obtains portions of the received signals from at least a subset of R/T points 14 that were received during this time window. In other words, for each of the R/T points 14 or for each of the subset of the R/T points 14 depending on the particular embodiment, the RX/TX processing system 16 obtains a sample that is a portion of the received signal from that R/T point 14 that is received during the time window during which an uplink SRS is expected.

The separate samples obtained the different R/T points 14 are time-multiplexed to provide a time-multiplexed signal that contains the samples and this time-multiplexed signal is sent to the appropriate node at which multilateration is performed (step 304). Notably, step 304 is optional. More specifically, the RX/TX processing system 16 is implemented as two or more network nodes as discussed above, and the samples may be provided from one network node to another via the time-multiplexed signal as discussed above. However, in some other embodiments, the samples may be provided from one network node to another in some other manner (e.g., via parallel streams). Also, in some embodiments, the samples may be obtained and multilateration may be performed by the same network node in which case the samples would not need to be communicated from one network node to another. In this case, step 304 may not be performed. Note, however, even if the samples are obtained and multilateration is performed in the same network node, step 304 may still be performed in some embodiments in order to, for example, reduce internal bandwidth demands.

From this point, the process proceeds as described above. In particular, the RX/TX processing system 16 computes range estimates for the ranges between the wireless device 18 and the R/T points 14 based on the corresponding samples (step 306). The RX/TX processing system 16 then computes the location of the wireless device 18 based on the range estimates using a multilateration technique (step 308).

Figure 7:
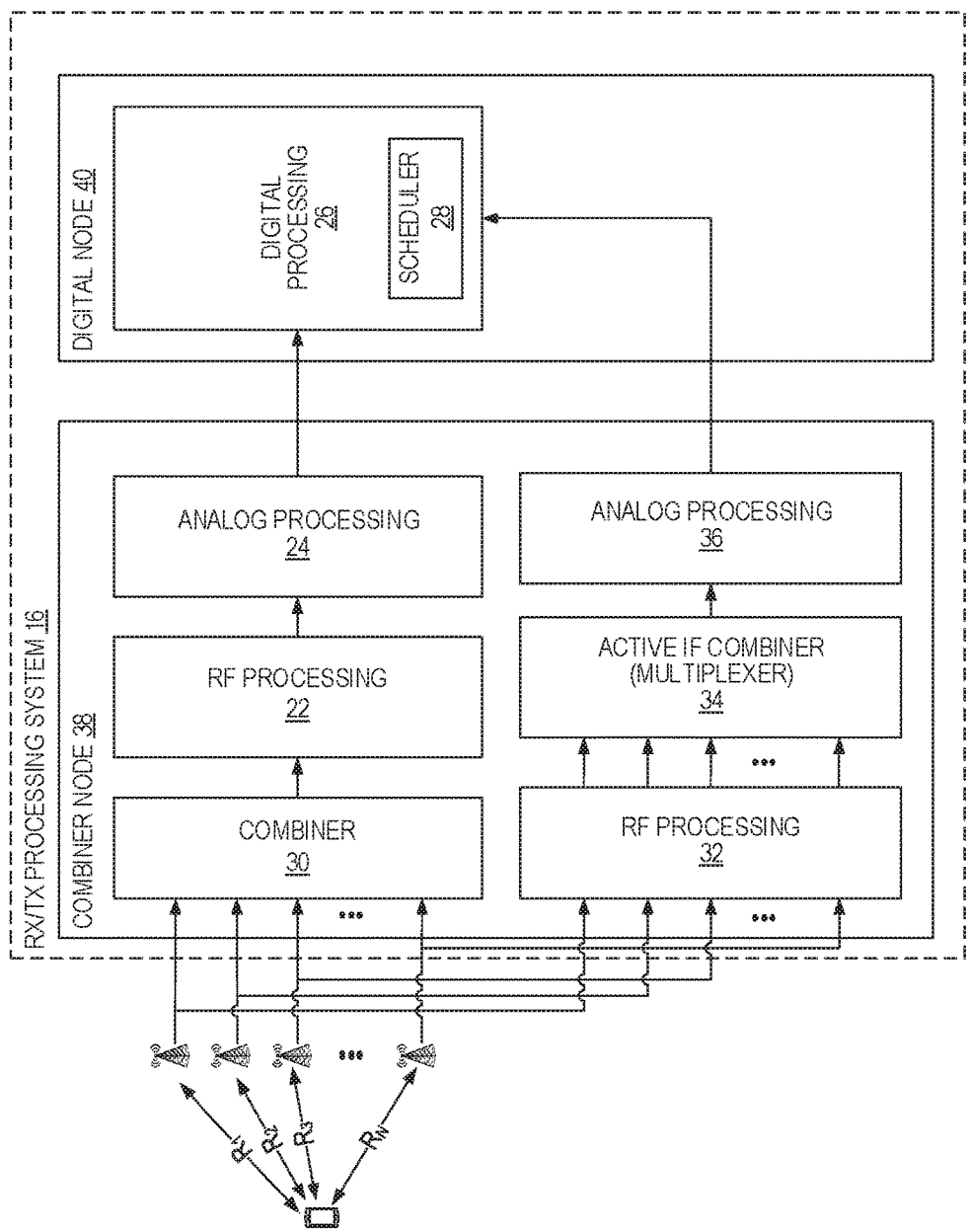
FIG. 7 illustrates the RX/TX processing system in more detail according to some other embodiments of the present disclosure.

In some embodiments, the RX/TX processing system 16 is implemented as two or more network nodes. For example, the RX/TX processing system 16 may be implemented as, or similar to, that in Ericsson's Radio Dot System (RDS). More specifically, as illustrated in FIG. 7, the combiner 30, the RF processing subsystem 22, the analog processing subsystem 24, the RF processing subsystem 32, the active IF combiner 34, and analog processing subsystem 36 may be implemented in a first network node, which is referred to as a combiner node 38. In some particular implementations, the combiner node 38 may be the IRU of an RDS. In the example of FIG. 7, the digital processing subsystem 26 is implemented in a second network node, which is referred to as a digital node 40. Importantly, the example of FIG. 7 illustrates the first and second network nodes (i.e., the combiner node 38 and the digital node 40) with respect to the embodiment of the RX/TX processing system 16 of FIG. 5; however, in the same manner, the embodiment of FIG. 3 may also be implemented as two network nodes. In other words, in another embodiment, the combiner node 38 includes the combiner and line muting subsystem 20, the RF processing subsystem 22, and the analog processing subsystem 24 of the RX/TX processing system 16 of FIG. 3. In some particular implementations the digital node is 40 is a digital unit in an RDS.

These two network nodes are connected by a link such as, for example, a Common Public Radio Interface (CPRI) link. In this case, the time-multiplexed signal containing the samples and the output of the analog processing subsystem 24 may both be provided to the digital processing subsystem 26 over the same link or over separate links. Notably, in some embodiments, the time-multiplexed signal containing the samples can be fit into an existing link by taking advantage of any available link bandwidth headroom, by using compression techniques, or by order puncturing of the data into one of the existing streams communicated over the link.

The following acronyms are used throughout this disclosure.

3GPP 3$^{rd}$ Generation Partnership Project
CPRI Common Public Radio Interface
E911 Enhanced 911
eNB Enhanced or Evolved Node B
FCC Federal Communications Commission
FFT Fast Fourier Transform
GPS Global Positioning System
ID Identifier
IF Intermediate Frequency
IRU Indoor, or Intermediate, Radio Unit
km/hr Kilometers per Hour
LTE Long Term Evolution
m Meter
ms Millisecond
OTDOA Observed Time Difference of Arrival
PRS Positioning Reference Signal
RDS Radio Dot System
RF Radio Frequency
R/T Receive/Transmit
RX/TX Reception/Transmission
SRS Sounding Reference Symbol
TDOA Time Difference of Arrival
UE User Equipment
UTDOA Uplink Time Difference of Arrival Those skilled in the art will recognize improvements and modifications to the embodiments of the present disclosure. All such improvements and modifications are considered within the scope of the concepts disclosed herein and the claims that follow.

What is claimed is:

1. A method of operation of one or more network nodes to determine a location of a wireless device in a shared cell environment, comprising:
    obtaining separate samples of at least a portion of one or more uplink transmissions received by at least a subset of a plurality of receive/transmit, R/T, points in a shared cell from the wireless device, the separate samples comprising, for each R/T point of the at least a subset of the plurality of R/T points in the shared cell, a sample of at least a portion of an uplink transmission received by the R/T point from the wireless device; and
    performing multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine a location of the wireless device;
    where obtaining the separate samples comprises:
        scheduling an uplink transmission by the wireless device;
        during a time window corresponding to the at least a portion of the uplink transmission by the wireless device, muting received signals output by all but one of the plurality of R/T points to thereby provide a non-muted receive signal corresponding to the at least a portion of the uplink transmission received by the one of the plurality of R/T points and muted receive signals for all of the other R/T points of the plurality of R/T points, the one of the plurality of R/T points being one of the at least a subset of the plurality of R/T points;
        combining the non-muted receive signal and the muted receive signals during the time window corresponding to the at least a portion of the uplink transmission by the wireless device to provide the sample of the at least a portion of the uplink transmission received by the one of the plurality of R/T points from the wireless device; and repeating operations of scheduling, muting, and combining for all of the other R/T points in the at least a subset of the plurality of R/T points.

2. The method of claim 1 wherein the time window corresponding to the at least a portion of the uplink transmission by the wireless device is a time window corresponding to an uplink sounding reference symbol included in the uplink transmission by the wireless device.

3. The method of claim 1 wherein performing multilateration comprises:
computing a range estimate for a range between the wireless device and each R/T point of the at least a subset of the plurality of R/T points based on the corresponding sample; and
computing the location of the wireless device based on the range estimates.

4. The method of claim 1 wherein obtaining the separate samples comprises:
scheduling an uplink transmission by the wireless device; and
during the time window corresponding to the at least a portion of the uplink transmission by the wireless device, prior to combining the received signals output by the plurality of R/T points to provide a combined receive signal for the shared cell, simultaneously obtaining portions of the received signals received by the at least a subset of the plurality of R/T points during the time window as the separate samples of the at least a portion of the uplink transmission received by the at least a subset of the plurality of R/T points.

5. The method of claim 4 wherein the time window corresponding to the at least a portion of the uplink transmission by the wireless device is a time window corresponding to an uplink sounding reference symbol included in the uplink transmission by the wireless device.

6. The method of claim 4 wherein obtaining the separate samples further comprises time-multiplexing the separate samples of the at least a portion of the uplink transmission received by the at least a subset of the plurality of R/T points to provide a time-multiplexed signal.

7. The method of claim 4 wherein performing multilateration comprises:
computing a range estimate for a range between the wireless device and each R/T point of the at least a subset of the plurality of R/T points based on the corresponding sample; and
computing the location of the wireless device based on the range estimates.

8. A system operable to determine a location of a wireless device in a shared cell environment, comprising:
a processing system for a shared cell of a cellular communications network operable to:
obtain separate samples of at least a portion of one or more uplink transmissions received by at least a subset of a plurality of receive/transmit, R/T, points in the shared cell from the wireless device, the separate samples comprising, for each R/T point of the at least a subset of the plurality of R/T points in the shared cell, a sample of at least a portion of an uplink transmission received by the R/T point from the wireless device; and
perform multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine the location of the wireless device;
where, in order to obtain the separate samples, the processing system is further operable to:
schedule an uplink transmission by the wireless device;
during a time window corresponding to the at least a portion of the uplink transmission by the wireless device, mute received signals output by all but one of the plurality of R/T points to thereby provide a non-muted receive signal corresponding to the at least a portion of the uplink transmission received by the one of the plurality of R/T points and muted receive signals for all of the other R/T points of the plurality of R/T points, the one of the plurality of R/T points being one of the at least a subset of the plurality of R/T points;
combine the non-muted receive signal and the muted receive signals during the time window corresponding to the at least a portion of the uplink transmission by the wireless device to provide the sample of the at least a portion of the uplink transmission received by the one of the plurality of R/T points from the wireless device; and
repeat operations of scheduling, muting, and combining for all of the other R/T points in the at least a subset of the plurality of R/T points.

9. The system of claim 8 wherein the time window corresponding to the at least a portion of the uplink transmission by the wireless device is a time window corresponding to an uplink sounding reference symbol included in the uplink transmission by the wireless device.

10. The system of claim 8 wherein, in order to perform multilateration, the processing system is further operable to:
compute a range estimate for a range between the wireless device and each R/T point of the at least a subset of the plurality of R/T points based on the corresponding sample; and
compute the location of the wireless device based on the range estimates.

11. The system of claim 8 wherein, in order to obtain the separate samples, the processing system is further operable to:
schedule an uplink transmission by the wireless device; and
during the time window corresponding to the at least a portion of the uplink transmission by the wireless device, prior to combining received signals output by the plurality of R/T points to provide a combined receive signal for the shared cell, simultaneously obtain portions of the received signals received by the at least a subset of the plurality of R/T points during the time window as the separate samples of the at least a portion of the uplink transmission received by the at least a subset of the plurality of R/T points.

12. The system of claim 11 wherein the time window corresponding to the at least a portion of the uplink transmission by the wireless device is a time window corresponding to an uplink sounding reference symbol included in the uplink transmission by the wireless device.

13. The system of claim 11 wherein, in order to obtain the separate samples, the processing system is further operable to time-multiplex the separate samples of the at least a portion of the uplink transmission received by the at least a subset of the plurality of R/T points to provide a time-multiplexed signal.

14. The system of claim 11 wherein, in order to perform multilateration, the processing system is further operable to:
compute a range estimate for a range between the wireless device and each R/T point of the at least a subset of the plurality of R/T points based on the corresponding sample; and
compute the location of the wireless device based on the range estimates.

15. A method of operation of one or more network nodes to determine a location of a wireless device in a shared cell environment, comprising:
obtaining separate samples of at least a portion of one or more uplink transmissions received by at least a subset of a plurality of receive/transmit, R/T, points in a shared cell from the wireless device, the separate samples comprising, for each R/T point of the at least a subset of the plurality of R/T points in the shared cell, a sample of at least a portion of an uplink transmission received by the R/T point from the wireless device; and
performing multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine a location of the wireless device;
where obtaining the separate samples comprises:
scheduling an uplink transmission by the wireless device;
during a time window corresponding to at least a portion of the uplink transmission by the wireless device, prior to combining received signals output by the plurality of R/T points to provide a combined receive signal for the shared cell, simultaneously obtaining portions of the received signals received by the at least a subset of the plurality of R/T points during the time window as the separate samples of the at least a portion of the uplink transmission received by the at least a subset of the plurality of R/T points; and
time-multiplexing the separate samples of the at least a portion of the uplink transmission received by the at least a subset of the plurality of R/T points to provide a time-multiplexed signal.

16. The method of claim 15 wherein:
the one or more network nodes comprise a first network node and a second network node;
obtaining the separate samples comprises obtaining the separate samples at the first network node;
performing multilateration comprises performing multilateration at the second network node; and
obtaining the separate samples further comprising sending the time-multiplexed signal from the first network node to the second network node.

17. The method of claim 16 wherein sending the time-multiplexed signal from the first network node to the second network node comprises sending the time-multiplexed signal from the first network node to the second network node over a common link with the combined receive signal for the shared cell.

18. A system operable to determine a location of a wireless device in a shared cell environment, comprising:
a processing system for a shared cell of a cellular communications network operable to:
obtain separate samples of at least a portion of one or more uplink transmissions received by at least a subset of a plurality of receive/transmit, R/T, points in the shared cell from the wireless device, the separate samples comprising, for each R/T point of the at least a subset of the plurality of R/T points in the shared cell, a sample of at least a portion of an uplink transmission received by the R/T point from the wireless device; and
perform multilateration based on range estimates for ranges between the wireless device and the at least a subset of the plurality of R/T points determined from the separate samples of the at least a portion of the one or more uplink transmissions received by the at least a subset of the plurality of R/T points in the shared cell from the wireless device to thereby determine the location of the wireless device;
where, in order to obtain the separate samples, the processing system is further operable to:
schedule an uplink transmission by the wireless device;
during a time window corresponding to at least a portion of the uplink transmission by the wireless device, prior to combining received signals output by the plurality of R/T points to provide a combined receive signal for the shared cell, simultaneously obtain portions of the received signals received by the at least a subset of the plurality of R/T points during the time window as the separate samples of the at least a portion of the uplink transmission received by the at least a subset of the plurality of R/T points; and
time-multiplex the separate samples of the at least a portion of the uplink transmission received by the at least a subset of the plurality of R/T points to provide a time-multiplexed signal.

19. The system of claim 18 wherein:
the system comprises a first network node and a second network node, the processing system being distributed across the first network node and the second network node such that:
the separate samples are obtained at the first network node; and
multilateration is performed at the second network node based on the separate samples obtained at the first network node;
wherein the first network node is operable to send the time-multiplexed signal from the first network node to the second network node.

20. The system of claim 19 wherein, in order to send the time-multiplexed signal from the first network node to the second network node, the processing system is further operable to send the time-multiplexed signal from the first network node to the second network node over a common link with the combined receive signal for the shared cell.

* * * * *